(12) United States Patent
Wallmeier et al.

(10) Patent No.: US 7,962,386 B2
(45) Date of Patent: Jun. 14, 2011

(54) ENTERPRISE SERVICE ARCHITECTURE PLATFORM ARCHITECTURE FOR MULTI-APPLICATION COMPUTER SYSTEM

(75) Inventors: Reiner Wallmeier, Wiesloch (DE); Monika Wirth, Frankfurt (DE); Jens-Peter Jensen, Ludwigshafen am Rhein (DE); Martin Schroter, Bad Schoenborn (DE); Oliver Kling, Bruchsal (DE)

(73) Assignee: SAP AG, Walldorf (DE)

(*) Notice: Subject to any disclaimer, the term of this patent is extended or adjusted under 35 U.S.C. 154(b) by 1394 days.

(21) Appl. No.: 10/921,831

(22) Filed: Aug. 20, 2004

(65) Prior Publication Data

US 2005/0234787 A1 Oct. 20, 2005

Related U.S. Application Data

(60) Provisional application No. 60/561,888, filed on Apr. 14, 2004, provisional application No. 60/574,925, filed on May 28, 2004.

(51) Int. Cl.
*G06Q 40/10* (2006.01)
(52) U.S. Cl. .......................... 705/35; 705/301
(58) Field of Classification Search .................. 705/35, 705/301
See application file for complete search history.

(56) References Cited

U.S. PATENT DOCUMENTS

2005/0144150 A1* 6/2005 Ramamurthy et al. ......... 706/45

OTHER PUBLICATIONS

Thomas Puschmann, Enterprise Application Integration Systems and Architecture—The case of Robert Bosch Group, 2004, Journal of Enterprise Information Management, vol. 7 No. 2, pp. 105-116.*

* cited by examiner

*Primary Examiner* — Kirsten S Apple
*Assistant Examiner* — Abdul Basit
(74) *Attorney, Agent, or Firm* — Kenyon & Kenyon LLP (57) ABSTRACT

Centralized process context and information context are provided for a computer system having an enterprise service architecture platform. The process context is a centrally accessible object storing and providing status data generated during performance of a process flow. The process context permits firm personnel to review performance of the process flow, for example, to determine its status and to identify any business exceptions that may have occurred therein. The information context caches information generated during performance of the process flow. It provides data on which to assess firm performance parameters, for example, time elapsed during performance of each process step and it provides a detailed set of information describing the process business activity. The process context and information context support higher-level monitoring functions. The process context and information context relieve operators from directly addressing a host of process-specific applications during performance of process flows.

15 Claims, 5 Drawing Sheets

FIG. 6
600

ENTERPRISE SERVICE ARCHITECTURE PLATFORM ARCHITECTURE FOR MULTI-APPLICATION COMPUTER SYSTEM

CROSS-REFERENCE TO RELATED APPLICATION

This application claims the benefit of priority afforded by provisional application provisional application Ser. No. 60/561,888, filed Apr. 14, 2004 and Ser. No. 60/574,925, May 28, 2004.

BACKGROUND

Embodiments of the present invention provide an Enterprise Service Architecture ("ESA") platform for a multi-application computer system in which banking processes are allocated across multiple applications.

Most modern firms use computer systems to manage their operations. Banks are no exception. They use computers to perform account management functions, loan origination, loan maintenance and virtually any other business process the bank performs. Thus, their computers not only execute applications to monitor information regarding their accounts, they also define the business processes that bank personnel must perform to perform banking transactions. SAP AG, the assignee of the present invention, currently sells a suite of applications to assist banks in performing these operations.

Various banking operations require access to a variety of applications. Common applications include customer relationship management ("CRM") applications, accounts management ("AM") applications, risk and finance management applications. There are others.

Although these applications are quite complex, they typically cover only a small portion of business functionality required by banks. Moreover, they typically provide different interface technologies and protocols for integration purposes. Accordingly, typical installations at each bank required the bank's personnel to become familiar with the applications and manually engage each application individually as the personnel perform operations. That is, to initiate a new loan, for example, a loan officer might have to engage an Accounts Management ("AM") application to retrieve data regarding an applicant's current accounts. The loan officer further might have to engage a Customer Relationship Management ("CRM") application to generate an internal credit rating for the customer and engage a Consumer & Mortgage Loan ("CML") application to develop pricing information regarding the new loan. The loan officer traditionally would be compelled to access each application directly to perform some incremental step in the origination process. This required business personnel to be intimately familiar with the IT landscape of its networks.

SAP AG recently has added a platform called "ESA platform for Banks" to its banking solution to facilitate access to its applications. The platform is a central component in which process flows are defined, a sequence of processing steps that are to be completed to perform some business transaction (e.g., loan origination). When progressing through a process flow, the banking backbone places calls to applications that formerly must have been addressed directly by firm personnel. The ESA platform, therefore, relieves firm personnel from becoming knowledgeable about network landscape. Instead, personnel are free to focus on the business processes themselves.

With the integration of an ESA platform into system architecture, the inventors perceived an opportunity to provide increased functionality to the ESA platform. Specifically, the inventors perceived an opportunity to provide centralized process monitoring and system monitoring functionality that previously has not been possible in an enterprise resource planning system.

DETAILED DESCRIPTION

Embodiments of the present invention provide a process context and an information context for a computer system having a banking ESA platform. The process context is a centrally accessible object storing and providing data generated during performance of a process flow. It typically stores all data that is necessary to control the process flow. The process context permits firm personnel to review performance of the process flow, for example, to determine its status and to identify any business exceptions that may have occurred therein. The information context stores information generated during performance of the process flow. It provides data on which to assess firm performance parameters, for example, time elapsed during performance of each process step and it provides a detailed set of information describing the process business activity. The process context and information context support higher-level monitoring functions as described below.

Figure 1:
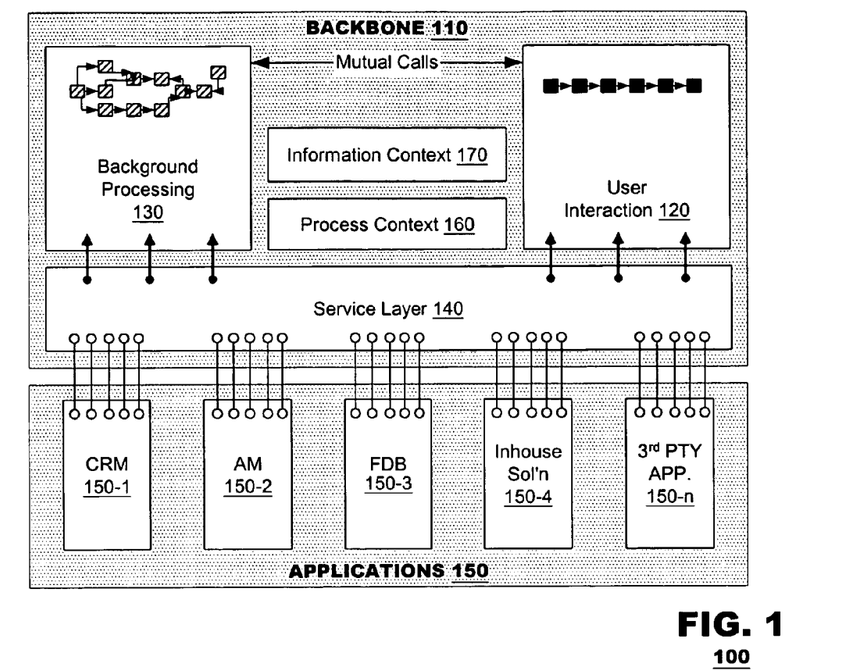
FIG. 1 is a functional block diagram of a runtime environment of an automated banking system.

FIG. 1 is a functional block diagram of a runtime environment of an automated banking system 100. The system 100 is illustrated as including a user interaction unit 120, a background processing unit 130, a service layer 140 and a plurality of applications 150. The user interaction module 120, as its name implies, supports data capture and data delivery functions with system operators. Thus, during the performance of some business process, it may query operators for operational data relevant to the business process and deliver such data, via the service layer 140, to one or more applications 150 as appropriate. The background processing module 130 similarly is engaged to process operational data pursuant to a business process. Again, it may retrieve operational data from an application 150 or from the user interaction module 120, perform some computational operation on the data and return results data to an application 150 or to the user interaction module 120. The service layer 140 is dedicated to exchange of data among the user interaction module 120, the background processing module 130 and the applications 150. Typically, the applications 150 define data exchange protocols for reading data from or providing data to the applications. These protocols are designed independently for each application 150-1 through 150-n and need not be compatible with counterpart protocols from other applications, the user interaction module 120 or the background processing module 130. The service layer 140 provides an interface to support such protocol differences.

An enterprise management system 100 commonly includes several applications, such as a customer relations management (CRM) application 150-1, an accounts management (AM) application 150-2 and a financial database (FDB) management application 150-3, among others. SAP AG, for example, presently sells such applications. These examples are non-exhaustive. Accordingly, FIG. 1 illustrates various other applications, such as an "in-house solution" 150-4 and a third party application 150-n, that may be members of the set of applications 150.

The ESA platform 110 operates according to several process flows to manage the operation of a firm. A process flow is a computer-readable object that models operation of a business process performed by the firm. For example, in a banking context, a first process flow might govern origination of a loan. A second process flow might govern loan maintenance. Other process flows would govern other business operations performed by the bank. These business processes typically require access to several applications 150 in the enterprise management system. A process flow is represented as a sequence of process steps, in which individual steps involve discrete elements of the modeled business process. The process steps may invoke operations from individual applications.

Figure 2:
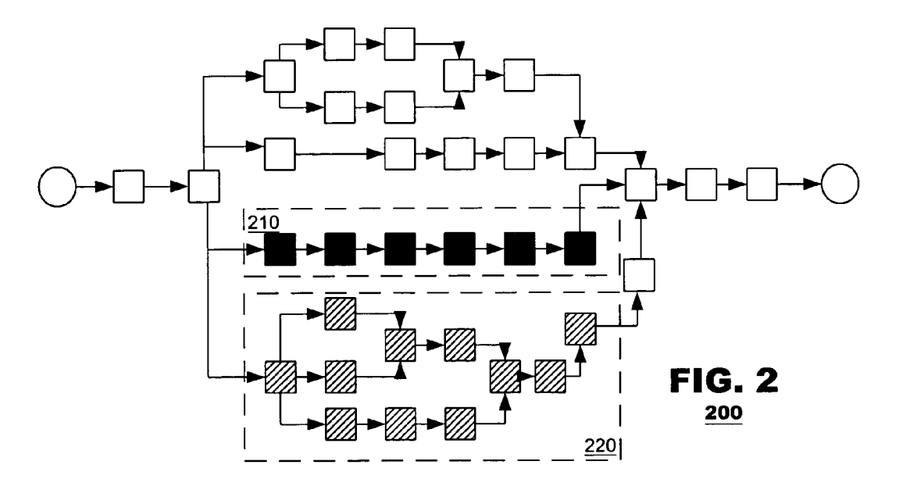
FIG. 2 illustrates an abstract process flow.

FIG. 2 illustrates an abstract process flow 200. Individual process steps are represented as squares in the figure. Process steps flow into other process steps. Further, it is permissible that a sequence of process steps (e.g., 210) may be performed on a parallel track as another sequence of process steps (e.g., 220). When the process is performed, some process steps may be allocated to the user interaction module 120 (e.g., sequence 210) and others may be allocated to the background processing module 130 (sequence 220). Decisions regarding assembly of step sequences and allocation of process steps among the user interaction module 120, the background processing module 130 and the applications 150 are made during the modeling phase prior to runtime, when the process flow is designed.

Each process step may be defined within the process flow with the following information:
 a header identifying an onset of the process step object;
 technical data integrating the process step object within the computer system's layout;
 a process type, identifying whether the step is a sub-process, a recurring step or a single step;
 identification of data that is input to the process step;
 identification of data to be output from the process step;
 identification of a service or application that the process step will call; and
 identification of data that will be passed to and from the called service.

A process step may be a decision point, it may call an application or it may call a workflow item or a service. In this regard, the operation of ESA platform systems is well-known.

Embodiments of the present invention introduce a process context 160 and an information context 170 to a ESA platform system 100. A process context 160 is an object provided in the system's runtime environment that maintains data regarding a business process that operates across multiple business applications. It is updated at discrete points during a process flow. Thus the process context 160 stores all data regarding an ongoing business process.

The information context 170 is a second data object maintained by the ESA platform 110, which extracts and possibly enriches information of process instances. In one embodiment, the information context 170 stores data on which the process steps operates. That is, the information context 170 may act as transient storage for data extracted from applications systems, data obtained from external services and/or data entered by operators during execution of the process steps. The information context 170 is a convenient tool, for example, for operators to use to drill down on data supporting operation of the process steps. Rather than refer to the various application systems, external services and data entry records, all data underlying an instance of the process flow may be present in the information context 170. Data from the information context may be fed to analyzers or data warehousing applications to assess performance of various process flows.

The information context provides an aspect of information integration, which has not been possible in prior systems that employ data warehousing. In traditional systems, data warehouses are filled from operative systems and typically updated on a periodic basis (e.g., overnight). Operative data, therefore, is routinely behind other systems' need for it (one day behind). Through use of the present invention, however, operative data may be gathered to the centralized information context immediately as it is produced or, at least, when the process flow has need for the data. This addresses three restrictions which had limited prior systems:
 it does not suffer from the data lag time that limited prior systems,
 it provides all the information belonging to one business activity, which was not possible with extraction, transformation and loading ("ETL") based solutions gathering data out of several applications.
 it provides data in near-real time rather than snapshots developed a predetermined times and, in doing so, it can retain data of intermediate change which might have been overwritten by subsequent changes in a snapshot period.
 ETL processes cause a pull of data to the information context rather than a push from the various application systems (e.g., the process flow and/or information context call for required data as it is needed).

The information context is described further in several examples below.

According to an embodiment of the present invention, standard definitions of process steps may be expanded to include commands to store data to a process context 160 or an information context 170 as specified. During progression of a process flow, the process context 160 may be supplemented with data relevant to the process represented by the flow itself. The process context 160, therefore, builds a central record of operational data from across multiple applications and services. Similarly, the information context 170 may be updated with data relevant to analytical systems or data warehousing applications during the progression of a process flow. This incremental updating of the process context 160 and information context 170 provides an opportunity for near real time information integration and monitoring functions as described below.

Figure 3:
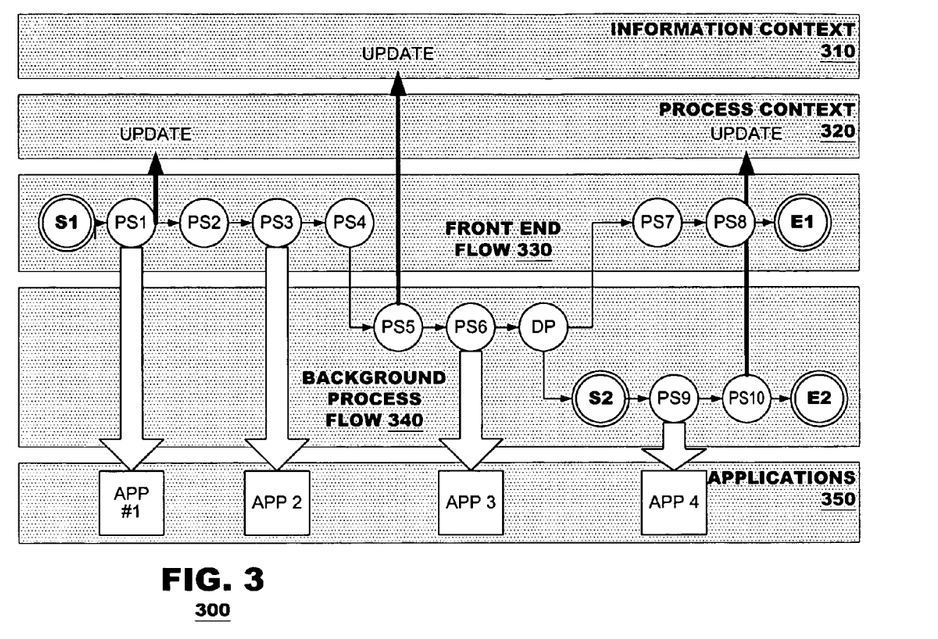
FIG. 3 illustrates an exemplary process flow and its interaction with an information context and a process context according to an embodiment of the present invention.

FIG. 3 illustrates an abstract process flow 300 according to an embodiment of the present invention and its interaction with an information context 310 and a process context 320. The process flow may include a number of process steps PS1-PS10, which are distributed throughout the user interface module 330 and the background process module 340 as desired. The process step labeled DP represents a decision point, which may cause a branch in the process flow. One possible resolution of the decision point DP may cause the process flow to follow process steps PS7-PS8 to end at end point E1. Another resolution at decision point DP may cause the process flow to follow process steps P9-P10, from S2 to E2.

In the example of FIG. 3, process steps PS1, PS3, PS6 and PS9 each make calls to applications 1-4 as illustrated. Process step PS1 also causes results from the process step to be stored to the process context 320. A process step PS10 also causes data to be written to the process context 320. Process step PS5 causes data to be written to the information context 310.

Figure 4:
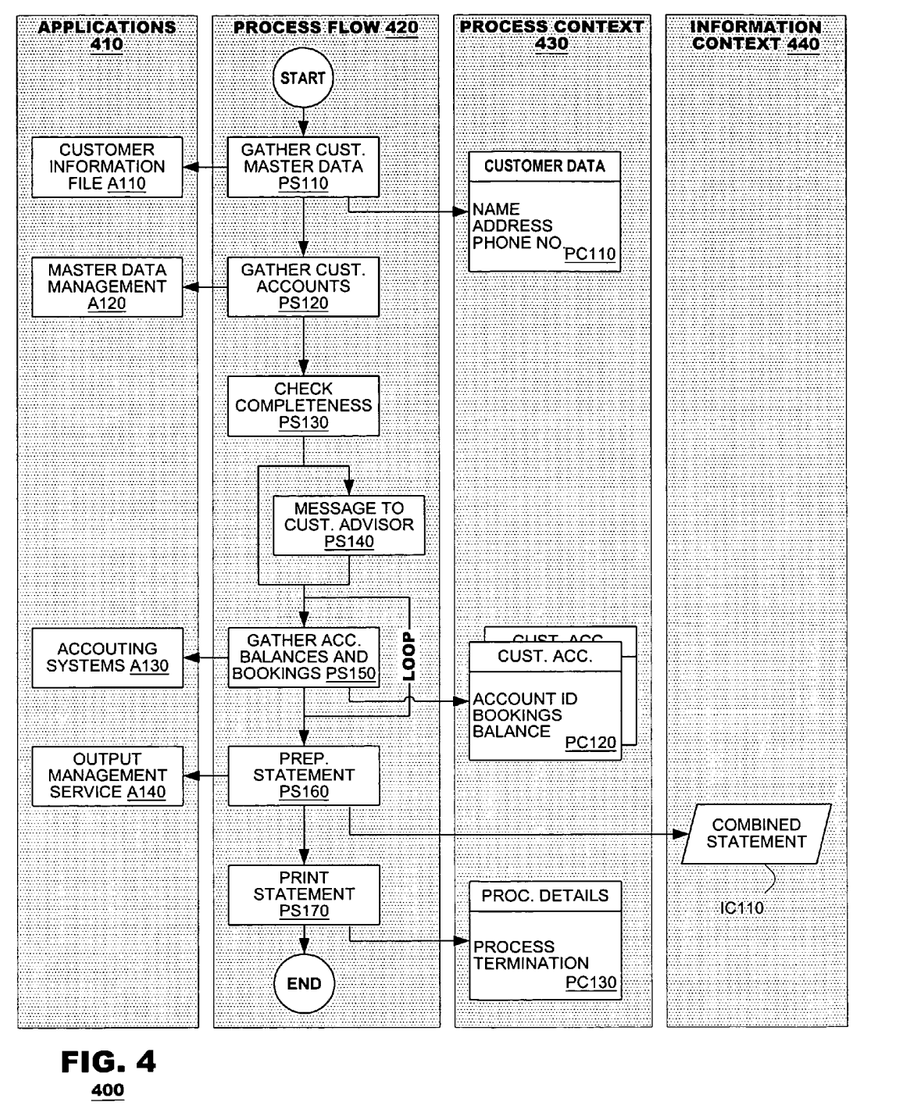
FIG. 4 illustrates another exemplary process flow, process context and information context according to an embodiment of the present invention.

FIG. 4 illustrates an example of the foregoing embodiments of the present invention in operation. Again, the system includes applications 410, a process flow 420, a process context 430 and an information context 440. The process flow 420 includes a plurality of process steps PS110-PS170. In this example, the process flow 420 is designed to prepare a combined statement for a customer in which the statement identifies current status of a plurality services associated with the customer (e.g., loans, savings accounts, etc.).

The first process step (PS110) gathers customer 'master data" in response to an input that identifies the customer. It may call a CRM application (A110) to access a customer information file and to retrieve a customer's master file. At conclusion of the process step PS110, data is written to the process context 430 representing customer data such as the customer's name, address and phone number (PC110). The next process step PS120 retrieves data representing the customer's accounts (PS120), again, by accessing records in the CRM application (A120). The next process step reviews the customer account records to determine whether they are complete (PS130). If the process step identifies incomplete customer records, the process flow advances to process step PS140 where the system generates an alert message to a customer advisor. Otherwise, the process flow advances to process step PS150. Process step PS130, therefore, is an example of a decision point.

Process step PS150 may be reached directly from process step PS130 or after completion of process step PS140. At this point, the process flow gathers financial data for the various customer accounts identified at PS120 by making calls to the accounts management application (A130). Specifically, the process flow gathers account balance and bookings data. The process flow repeats operation of process step PS150 for as many customer accounts as are identified from the CRM application. At the conclusion of each iteration, the process step PS150 stores the retrieved data into separate objects in the process context 430. Thereafter, the process flow 430 prepares a customer statement (PS160). In doing so, the process step PS160 calls an output management service that generates a report using the account data retrieved at process step PS150, using data from the information context 440. At the conclusion of process step PS160, the step stores data to the process context 430 indicating that a combined statement was prepared (IC110). Finally, at process step PS170, the statement is printed and data is written to the process context 430 indicating that the process flow completed successfully.

Figure 5:
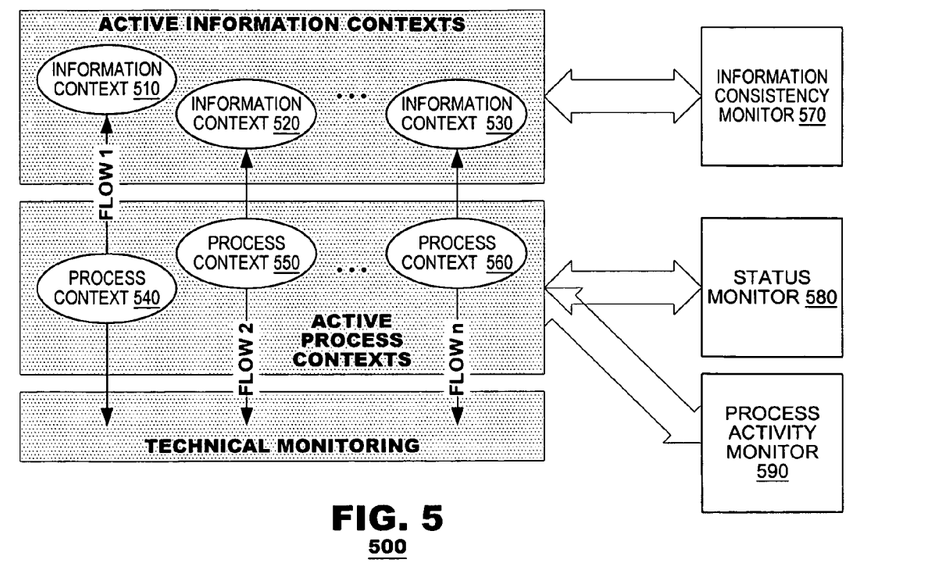
FIG. 5 illustrates a monitoring system according to another embodiment of the present invention.

The process contexts and information contexts of the foregoing embodiments provides an opportunity to perform additional monitoring functions. FIG. 5 illustrates a monitoring system 500 according to another embodiment of the present invention. FIG. 5 illustrates a plurality of active process flows, labeled flow 1-flow n. For each instance of the process flow, there will be corresponding instances of information contexts 510-530 and process contexts 540-560. Embodiments of the present invention also may include an information consistency monitor process 570, status monitoring process 580 and a process activity monitoring process 590. The information consistency monitor 570 may survey content of active information contexts 510-530 to determine whether the data contained therein possesses consistency errors to confirm that data is delivered in a complete and timely fashion. The information consistent monitor 570 also may review process performance data (e.g., time to completion of process steps) to develop statistical performance indicators regarding firm processes or personnel.

The status monitor 580 provides a review of a specified process context (say, context 550). Business personnel may review the process context 550 to check on the status of a specified customer activity. The process context 550 provides a particularly convenient monitoring function because, since it is segregated from ordinary technical monitoring functions, it is likely to contain information with is directly relevant to the business processes of the flow itself.

Status monitoring 580 functions can provide various levels of access to a process context. First, a direct review of the process context data is permitted, with appropriate user interface functionality to describe key figure data using appropriate identifiers (e.g., to present a first set of fields as "account balances," etc.). It indicates which process steps were completed successfully and any business exceptions that occurred during flow execution. It also may provide pointers to data elements stored by the applications themselves to provide business personnel an opportunity to drill down on data stored within the process context 550 itself. Alternatively, a status monitor 580 may review process context data using a predetermined workflow if, for example, a technical or business error were identified in the process context.

The process activity monitor 590 may collect data across a plurality of process contexts 540-560 to generate performance indicators representing effectiveness of the process flow itself. The process activity monitor 590 may determine how many process flows of a specified type are open at any given point in time. Similarly, the process activity monitor 590 may determine how many process flows reached successful completion without occurrence of a technical or business error. The process activity monitor 590 also may measure latencies of individual process steps to identify, for example, which steps are contributing appropriate or unnecessary delay toward the completion of a process flow. Thus, the process activity monitor 590 may generate performance data from which an organization can quantify comparative expense of its business processes and process steps and feed the results back into a process optimization.

As illustrated, process contexts and information contexts can be updated incrementally as individual process steps containing relevant data are completed. This permits the monitors 570-590 herein the opportunity to generate performance indicators or provide status reports on a near real time basis.

Figure 6:
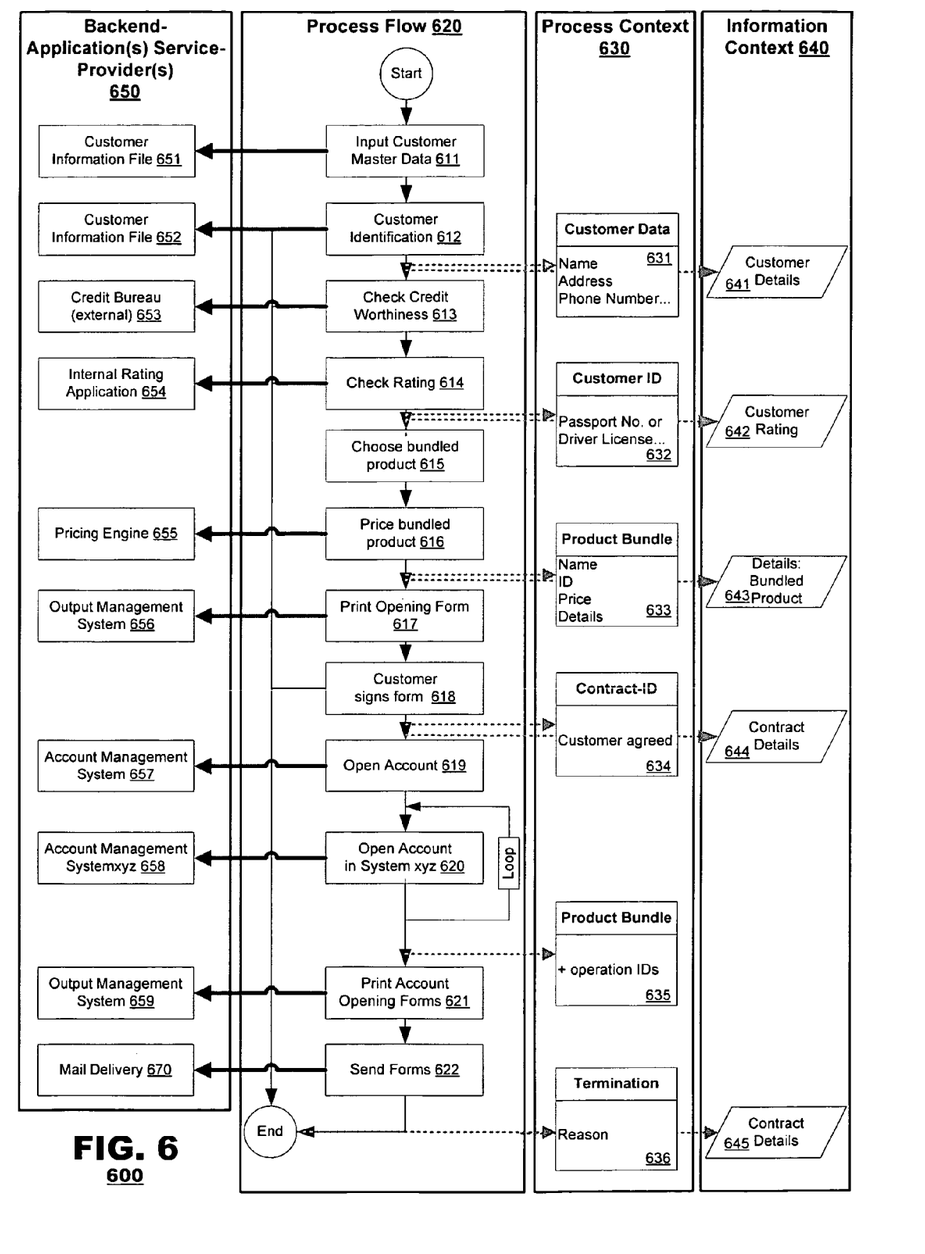
FIG. 6 illustrates a further exemplary process flow, process context and information context according to an embodiment of the present invention.

FIG. 6 illustrates another example of the present invention. Again, the system may include a process flow 610, a process context 630, an information context 640 and a number of backend application or service providers (collectively 650). The process flow includes a number of process steps 611-622. At the conclusion of certain process steps (e.g. 612, 614, etc.), data may be stored to the process context 630 and/or information context 640 (e.g., elements 631, 632, 641, 642).

The process flow 610 of FIG. 6 illustrates an example of a sale of bundled product offered by a bank. For example, the bank may bundle mortgage loan and life insurance products or saving account and funds products. The process flow 610 may begin by obtaining customer master data (611), which causes data to be retrieved from a customer information file (651). Customer identification (612) causes basic customer data to be retrieved from a CRM application and stored in both the process context and information context (631, 641). The types of data stored in the process context and information context may be tailored to fit system needs. The process context in one embodiment, for example, may store data to identify a customer in other systems or to store e.g. its address record for further processing by other systems. The information context 640 may store data describing the customer with all the details that are necessary for e.g. regulatory reporting or marketing related analysis, including, for example, a class of business of a customer.

At process step 613, the process flow may check credit worthiness of the customer. This typically causes a referral to an external credit bureau (653). Assuming the customer has a sufficiently high credit worthiness, the system may rate the customer (614). At this stage, further customer information, such as a customer ID, may be stored to the process context (632). Additionally, customer rating data may be stored to the information context (642). Customer rating data may be generated by a rating application (654) and, of course, stored in a memory system assigned to such application. As noted above, storing the rating data in the information context generates a centralized repository for all data generated during performance of a process flow, which is more easily accessed via the information context rather than through access to a large set of individual applications.

A bundled product is chosen at step 615. Thereafter, the bundled product is priced (616). Pricing of the bundled product may be performed by a pricing engine (655) and may use data stored by the information context 640, for example the customer rating, to perform its calculations. Results from the pricing engine can be stored to the process context 630 and/or the information context 640 (633, 643). By way of example, the process context 630 may store data representing the conditions and details to create an account in an application. The information context 640 may store analytic data from an analytical perspective. In some embodiments, the information context and process context may store the same set of data.

Forms may be printed at step 617, which engages an output management system 656. At step 618, an operator may indicate that the customer has signed necessary forms. At this point, data may be stored to the process context indicating that contract(s) representing the bundled product(s) are effective (634). Contract details may be stored to the information context (644). Thereafter, the process flow 610 may open a master account (619) in an account management system (656) and additional accounts (620) in application-specific account management systems (657) to represent components of the bundled product. Thereafter, the process flow may cause the process context 630 to store operational identifiers of the accounts (635). The process flow 610 may conclude by printing account opening forms (621) and sending the forms to the customer (622). These process steps may invoke corresponding processes from an output management system (658) and mail delivery system (659).

During execution of the process flow 610, the flow may terminate prematurely as governed by the process steps themselves. For example, a given customer may not have sufficient credit worthiness to support its application for a bundled product. If an instance of the process flow does not conclude with successful sale of the bundled product, reasons for termination may be stored to the process context (636). For example, if a buyer could not meet or could not agree upon certain contract details, data representing such failures may be stored for later analysis. Additionally, if the customer could not or refused to meet specific contract details set forth in the bundled product, data representing such contract details can be stored at the information context (645).

Figure 7:
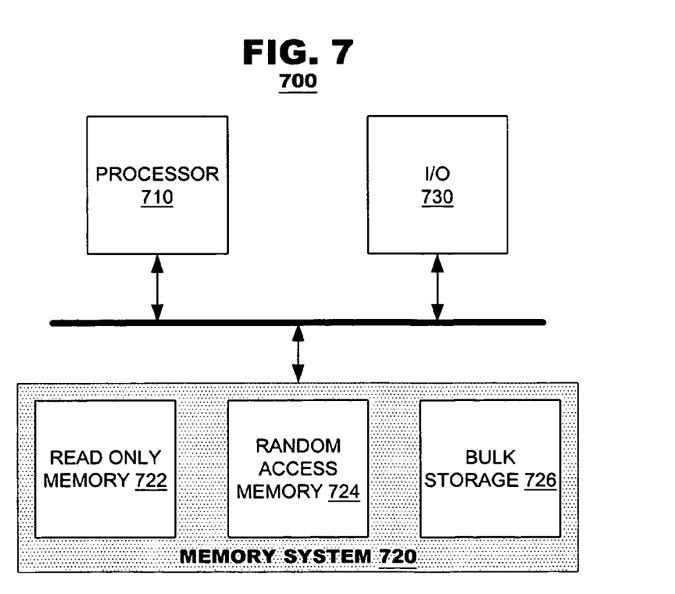
FIG. 7 is a simplified block diagram of a computer system suitable for use with the present invention.

Functionality of the foregoing embodiments may be provided on various computer platforms executing program instructions. One such platform 700 is illustrated in the simplified block diagram of FIG. 7. There, the platform 700 is shown as being populated by a processor 710, a memory system 720 and an input/output (I/O) unit 730. The processor 710 may be any of a plurality of conventional processing systems, including microprocessors, digital signal processors and field programmable logic arrays. In some applications, it may be advantageous to provide multiple processors (not shown) in the platform 700. The processor(s) 710 execute program instructions stored in the memory system. The memory system 720 may include any combination of conventional memory circuits, including electrical, magnetic or optical memory systems. As shown in FIG. 7, the memory system may include read only memories 722, random access memories 724 and bulk storage 726. The memory system not only stores the program instructions representing the various methods described herein but also can store the data items on which these methods operate. The I/O unit 730 would permit communication with external devices (not shown).

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computer system, comprising:
   a processing system;
   a computer-readable storage medium;
   a plurality of business management applications to be executed by the processing system to manage performance of business processes of a firm;
   a platform application to be executed by the processing system having defined therein a plurality of process flows, each process flow comprising a plurality of process steps executable by the processing system;
   a process context to store data generated by a plurality of process steps of a single instance of an ongoing process flow, the process context being located within a runtime environment of the processing system, wherein the process context is centrally accessible by the plurality of business management applications and the platform application, wherein the data generated by the process steps is stored by the process context incrementally after each process step has been completed;
   an information context to cache data generated by respective business management applications when they are invoked by the ongoing process flow, the information context being located within the runtime environment of the processing system, wherein the information context is centrally accessible by the plurality of business management applications and the platform application during the execution of the ongoing process flow, wherein the data generated by the business management applications is cached by the information context incrementally after a respective process step invoking a respective business management application has been completed and said data is used by subsequent process steps within the ongoing process flow to complete the subsequent process steps;
   a monitoring agent to survey process contexts instantiated, collect performance data from process steps incrementally after each process step has been completed and generate reports regarding the collected performance data of the ongoing process flow, wherein the performance data includes delays of individual process steps, a number of successfully completed process steps and errors encountered during one or more process steps; and wherein the process steps include calls to specified business management applications and commands to store data generated from the process steps to the process context.

2. The system of claim 1, wherein the process context stores status information identifying process steps within the ongoing process flow that have been completed.

3. The system of claim 1, wherein the process context stores information identifies a next process step to be completed.

4. The system of claim 1, wherein the cached data is stored to the information context pursuant to calls to the respective business management applications.

5. A computer-implemented method for process flow management, comprising the steps of:

executing, by a processor, a set of instructions stored on a computer-readable storage medium, the executed instructions performing the steps of:

calling a plurality of business management applications necessary to complete a single instance of an ongoing process flow including a plurality of process steps, each business management application dedicated to management of a discrete set of business operations;

providing data for a respective process step of the ongoing process flow to a respective business management application;

receiving output data from the respective business management application, the output data including status data for the respective process step of the ongoing process flow;

resolving a decision point for the ongoing process flow that determines which of a plurality of subsequent process steps are to be performed;

storing the status data of the respective process step to a process context associated with the ongoing process flow, wherein the process context is located within a runtime environment of a processing system and is centrally accessible by the plurality of business management applications during execution of the ongoing process flow, wherein status data for each process step of the ongoing process flow is stored to the process context incrementally after each process step has been completed;

collecting performance data from each process step incrementally after each process step has been completed, wherein the performance data includes delays of individual process steps, a number of successfully completed process steps and errors encountered during one or more process steps;

caching data generated by the respective business management application during the respective process step of the ongoing process flow in a information context, the cached data in the information context is used by the plurality of business applications during subsequent process steps within the ongoing process flow to complete the subsequent process steps, wherein the information context is located within the runtime environment of a processing system and is centrally accessible by the plurality of business management applications during execution of the ongoing process flow; and providing data from the process context to an analyzer application.

6. The method of claim 5, further comprising retrieving and displaying data from the process context in response to a status request.

7. The method of claim 5, further comprising retrieving and displaying data from the process context in response to a status request.

8. A computer-readable storage medium storing instructions that, when executed by a processor, perform the steps of:

calling a plurality of business management applications necessary to complete a single instance of an ongoing process flow including a plurality of process steps, each business management application dedicated to management of a discrete set of business operations;

providing data for a respective process step of the ongoing process flow to a respective business management application;

receiving output data from the respective business management application, the output data including status data for the respective process step of the ongoing process flow;

resolving a decision point for the ongoing process flow that determines which of a plurality of subsequent process steps are to be performed;

storing the status data of the respective process step to a process context associated with the ongoing process flow, wherein the process context is located within a runtime environment of a processing system and is centrally accessible by the plurality of business management applications during execution of the ongoing process flow, wherein status data for each process step of the ongoing process flow is stored to the process context incrementally after each process step has been completed;

collecting performance data from each process step incrementally after each process step has been completed, wherein the performance data includes latencies for individual process steps, a number of successfully completed process steps and errors encountered during one or more process steps;

caching data generated by the respective business management application during the respective process step of the ongoing process flow in a information context, the cached data in the information context is used by the plurality of business applications during subsequent process steps within ongoing the process flow to complete the subsequent process steps, wherein the information context is located within the runtime environment of a processing system and is centrally accessible by the plurality of business management applications during execution of the ongoing process flow; and providing data from the process context to an analyzer application.

9. The computer-readable storage medium of claim 8, further comprising the step of:

retrieving and displaying data from the process context in response to a status request.

10. The computer-readable storage medium of claim 8, wherein status data of the respective process step of the ongoing process flow is stored in the process context in response to an instruction from the respective process step.

11. The computer-readable storage medium of claim 8, wherein data generated by the respective business management application during the respective process step of the ongoing process flow is cached in the information context in response to an instruction from the respective process step.

12. The computer system of claim 1, wherein data generated by process steps of the ongoing process flow is stored in the process context in response to an instruction from a process step.

13. The computer system of claim 1, wherein data generated by the business management applications during the ongoing process flow is cached in the information context in response to an instruction from a process step.

14. The computer-implemented method of claim 5, wherein status data of the respective process step of the ongoing process flow is stored in the process context in response to an instruction from the respective process step.

15. The computer-implemented method of claim 5, wherein data generated by the respective business management application during the respective process step of the ongoing process flow is cached in the information context in response to an instruction from the respective process step.

* * * * *